United States Patent
Wei (10) Patent No.: US 11,401,592 B2
(45) Date of Patent: Aug. 2, 2022

(54) LINER ALLOY, STEEL ELEMENT AND METHOD

(71) Applicant: SSAB ENTERPRISES LLC, Mobile, AL (US)

(72) Inventor: Lingyun Wei, Mobile, AL (US)

(73) Assignee: SSAB ENTERPRISES LLC, Mobile, AL (US)

( * ) Notice: Subject to any disclaimer, the term of this patent is extended or adjusted under 35 U.S.C. 154(b) by 0 days.

(21) Appl. No.: 16/972,707

(22) PCT Filed: Nov. 29, 2019

(86) PCT No.: PCT/US2019/063834
§ 371 (c)(1),
(2) Date: Dec. 7, 2020

(87) PCT Pub. No.: WO2021/107959
PCT Pub. Date: Jun. 3, 2021

(65) Prior Publication Data
US 2021/0310106 A1    Oct. 7, 2021

(51) Int. Cl.
*B32B 15/00*    (2006.01)
*C22C 38/32*    (2006.01)
(Continued)

(52) U.S. Cl.
CPC ............ *C22C 38/32* (2013.01); *C21D 1/18* (2013.01); *C22C 38/02* (2013.01); *C22C 38/04* (2013.01); *C22C 38/06* (2013.01); *C22C 38/14* (2013.01); *C22C 38/44* (2013.01); *C22C 38/46* (2013.01); *C22C 38/48* (2013.01); *C23C 30/005* (2013.01); *C21D 2211/001* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 4,790,875 A * | 12/1988 | Urano | C22C 33/0285 75/231 |
| 4,966,751 A | 10/1990 | Kaede et al. | |
| 2005/0271541 A1* | 12/2005 | Hamano | C22C 38/02 420/61 |

FOREIGN PATENT DOCUMENTS

| | | |
|---|---|---|
| GB | 612001 A | 11/1948 |
| GB | 647701 A | 12/1950 |

(Continued)

OTHER PUBLICATIONS

International Search Report was dated Apr. 9, 2020 by the International Searching Authority for International Application No. PCT/US2019/63834, filed on Nov. 29, 2019 (Applicant—SSAB Enterprises LLC) (2 Pages).

*Primary Examiner* — Seth Dumbris
*Assistant Examiner* — Kim S. Horger
(74) *Attorney, Agent, or Firm* — Ballard Spahr LLP (57) ABSTRACT

Disclosed is a liner alloy and a steel element with a liner alloy element. The liner alloy comprises from 0.5 to 3 wt. % of C, from 10 to 30 wt. % of Cr, less than 2 wt. % of B, less than 4 wt. % of Ti, less than 4 wt. % of Nb, less than 1 wt. % of V, less than 1.5 wt. % of W, from 0.5 to 2 wt. % of Mo, from 0.5 to 2 wt. % of Mn, less than 1 wt. % of Si, less than 0.5 wt. % of Al, wherein the wt. % is based on total weight of the liner alloy with remainder being Fe and inevitable impurities.

19 Claims, 6 Drawing Sheets

(51) Int. Cl.
*C21D 1/18* (2006.01)
*C22C 38/02* (2006.01)
*C22C 38/04* (2006.01)
*C22C 38/06* (2006.01)
*C22C 38/14* (2006.01)
*C22C 38/44* (2006.01)
*C22C 38/46* (2006.01)
*C22C 38/48* (2006.01)
*C23C 30/00* (2006.01)

(56) References Cited

FOREIGN PATENT DOCUMENTS

| | | | |
|---|---|---|---|
| GB | 741935 A | 12/1955 | |
| WO | WO 2004/108970 A2 | 12/2004 | |
| WO | WO-2019191400 A1 * | 10/2019 | ......... B23K 35/0261 |

* cited by examiner

Fig. 7 and
LINER ALLOY, STEEL ELEMENT AND METHOD

CROSS-REFERENCE TO RELATED APPLICATIONS

This application is a U.S. National Phase Application of International Application No. PCT/US2019/063834, filed Nov. 29, 2019, which is hereby incorporated by reference in its entirety.

FIELD OF THE INVENTION

The present invention relates to a liner alloy and a steel element comprising deposited liner alloy used in quarry, mining, cement, steel mill and recycling industries, for instance, where abrasive contents require durable surfaces.

One of the problems associated with these industries is how to extend the service life of transport equipment that carry abrasive and corrosive media or materials such as slurries, for example.

BACKGROUND OF THE INVENTION

Liner alloy products prolong the lifetime of equipment in extreme wear situations. The liner alloy materials work especially well in sliding wear environments where small and hard materials are processed such as coal with high quartz content. It can withstand different types of wear such as abrasion, heat, metal-to-metal and erosion wear.

Chromium Carbide Overlay (CCO) is known a slurry pipe technology. The CCO technology provides good wear resistance but no or limited corrosion resistance. During manufacturing of the CCO surface in the pipe, cracks through the CCO to the base alloy are created due to inherent brittleness of the CCO chemistry and microstructure. Thereafter during use, the corrosive fluid penetrates the existing cracks, which thereby generates corrosion in the base alloy. Consequently, due to the corrosion in the base alloy, the slurry pipes must be replaced after a couple of months.

Recently, traditional requirements of abrasive resistance have been upgraded to abrasive-corrosion resistance. The previously known liner materials do not fulfil these upgraded requirements. An innovative and efficient solution to this complex metallurgical problem is clearly needed to design liner alloys that can provide both corrosion and wear resistance.

BRIEF DESCRIPTION OF THE INVENTION

An object of the present invention is to provide a liner alloy, a steel element comprising deposited liner alloy and a method for obtaining said steel element to solve the above-mentioned problems.

The objects of the invention are achieved by a steel alloy with a chemical composition which is characterized by what is stated in the independent claims 1 and 13. The preferred embodiments of the invention are disclosed in the dependent claims.

The invention is based on the idea of overlaying the base steel with a liner alloy that is both wear and corrosion resistant. The alloy obtained by the chemical composition stated in the independent claim 1 provides a liner alloy element meeting the upgraded abrasive-corrosion resistance requirements.

Advantages obtained by such composition are greater wear resistance, lower crack tendency and higher corrosion resistance.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

The Fe—Cr—C (iron-chromium-carbon) tertiary system serves as the basis for almost all ferrous based liner alloys. Compared with the nickel tungsten carbide system, the iron-based chromium carbide alloy has a lower cost, flexibility as a welding filler metal, and potential for excellent erosion-corrosion resistance due to its high chromium content. Composition of major alloying elements and subtle additions of minor alloying elements have complex effects on eutectic alloy microstructure.

Numerous studies have focused on developing the alloyed carbonitride structures in the liner alloy. The technical features include a systematic study of the minor elements, such as N (nitrogen), B (boron), Nb (niobium) and Ti (titanium), on chromium carbonitrides in the Fe—Cr—C system.

Effects of Ti and B in steel casting and welding coating were studied to obtain advanced wear resistance. The effect of Nb and other strong carbide forming elements on wear resistance of liner alloys was also extensively explored. The NbC being extremely hard, shifts the eutectic point to higher carbon content, and therefore the alloy can have higher carbon without the danger of forming brittle hyper eutectic carbides. N is not included in the alloy composition, but a small amount of N may exist in the overlay due to welding exposure to air. N has the effect of alloying the MC type carbides to M(C, N) type carbonitrides.

Commercial electrodes that use borides instead of carbides have also been developed. The oriented $Fe_2B$ crystals show excellent slurry erosion resistance although the liner alloy has a tendency for cracking.

Iron-based wear resistant liner alloys derive their basic chemical composition from the Fe—Cr—C system. Depending on the cooling rate, the resultant liner alloy can have stifled peritectic "duplex" carbides in a pearlitic or martensitic matrix. Depending on the composition, the liner alloy can be hypo-eutectic, eutectic, or hyper-eutectic. The eutectic morphology is the result of a transformation that involves liquid at higher temperature.

The hypo-eutectic liner alloy in this context has a steel primary solidification matrix and contains a smaller amount of alloying elements and little or no eutectic carbides. It usually has a superior resistance to weld cracking, excellent corrosion resistance but relatively low wear resistance.

In contrast, the hyper-eutectic liner alloy in this context, contains the highest amount of alloying elements, is more costly, has a primary solidified carbide as the major phase, and contains steel grains as one eutectic component and often networked carbide as the other eutectic component.

If controlled well by both composition and cooling, the eutectic liner alloy has the potential of providing an excellent combination of properties. However, the challenge is how to control the eutectic morphology, especially the faceted carbide growth, through the welding material design. This challenge arises from a required balance in material performance—that a higher content and greater size of carbides in a liner alloy would give a greater wear resistance but it also would lead to a higher crack tendency, a higher cost and often a lower corrosion resistance.

When solving the previously described problem, it was realised that excellent wear, crack and corrosion resistant liner alloys are obtained with below-explained compositions, and the below-explained steel element with microstructure obtained with the method and said composition.

Liner Alloy Composition

In some embodiments, the alloy can be described by a chemical composition in weight percent (wt. %) comprising the following elemental ranges which have been investigated and evaluated and meet the disclosed microstructural and performance criteria. A chemical composition of the liner alloy according to the embodiment will be illustrated below. The liner alloy comprises from 0.5 to 3 wt. % of C, from 10 to 30 wt. % of Cr, less than 2 wt. % of B, less than 4 wt. % of Ti, less than 4 wt. % of Nb, less than 1 wt. % of V, less than 1.5 wt. % of W, from 0.5 to 2 wt. % of Mo, from 0.5 to 2 wt. % of Mn, less than 1 wt. % of Si, less than 0.5 wt. % of Al, wherein the wt. % is based on total weight of the liner alloy with remainder being Fe and inevitable impurities.

C (carbon) is considered the most important alloying element in steel. Increasing C content increases hardness and strength and improves hardenability. However, higher C content also increases brittleness and reduces weldability. When the carbon content in steel is below 0.8 wt. %, the strength and hardness of the steel increase with the carbon content added while the plasticity and toughness decrease. However, when the carbon content increases above 1.0 wt. %, the strength of the steel decreases. The liner alloy may comprise C in an amount from 0,5 to 3 wt. %, and in some embodiment from 0.7 to 1.0 wt. %.

Cr (chromium) improves hardenability, strength and wear resistance and increases corrosion resistance at high concentrations (above 10%). The corrosion resistance is due to the formation of a self-repairing passive layer of chromium oxide on the surface of the stainless steel. Cr is the main alloy in stainless steel, acid-resistant steel and heat-resistant steel. The liner alloy may comprise Cr in an amount from 10 to 30 wt. %, and in some embodiments from 15 to 20 wt. %. The selection of this range of Cr is based on a balance between the amount of Cr in solid-solution in the matrix for corrosion resistance and the amount of Cr in carbides and borides for wear resistance. If chromium content is below 15 wt. %, corrosion resistance is deteriorated, and if Cr content is above 20 wt. %, increased brittleness occurs.

B (boron) improves deformability and machinability and is a highly effective hardenability agent. Borides are produced by melting or sintering metals with boron and they can take many forms and structures. Borides display excellent mechanical properties since they are extremely hard which makes them perfect material for steel hardening. They have very high melting temperature and therefore, they have great heat stability and resistance. They also possess excellent chemical stability against acids. The liner alloy may comprise B in an amount of less than 2 wt. %, and in some embodiments from 0.6 to 1.0 wt. %. The amount of B is dependent on the amount of boride forming elements such as Cr, Ti, etc.

Ti (titanium) improves strength and corrosion resistance and limits austenite grain size. Ti is added for carbide stabilization especially when the material is to be welded. It combines with carbon to form titanium carbides, which are quite stable and hard to dissolve in steel because of the strong bonding force. Ti is commonly used in stainless steel to fixate the carbon, to remove chromium dilution in the grain boundary in order to eliminate or reduce steel intergranular corrosion. Ti can also improve plasticity and toughness in ordinary low alloy steel. In high Cr stainless steel, Ti content is usually five times that of carbon. The liner alloy may comprise Ti in an amount of less than 4 wt. %, and in some embodiments from 0.5 to 3.5 wt. %. The amount of Ti is dependent on the C level for the formation of primary carbides.

Nb (niobium) is a strong carbide former and provides for precipitation hardening but its main contributions to increased strength is the retardation of austenite recrystallization thus promoting a fine-grain microstructure. In austenite steels, Nb is added to improve the resistance to intergranular corrosion but it also enhances mechanical properties at high temperatures. The liner alloy may comprise Nb in an amount of less than 4 wt. %, and in some embodiments from 0.5 to 3.5 wt. %. The amount of Nb is dependent on the C level for the formation of primary carbides.

V (vanadium) forms carbides like VC and increases strength, including impact strength, in alloy steels. It does so by precipitation hardening and keeping grain sizes small. V also improves creep resistance. The liner alloy may comprise V in an amount of less than 1 wt. %, and in some embodiments from 0.4 to 0.6 wt. %. The amount of V is selected to provide the right level of austenitic stability. W (tungsten) forms rather hard carbides like WC and $W_2C$ and is primarily used for the same reasons as given above for V. The liner alloy may comprise W in an amount of less than 1.5 wt. %, and in some embodiments from 0.1 to 0.3 wt. %. The amount of W is dependent on the C level for the formation of primary carbides.

Mo (molybdenum) is also a carbide former and is frequently used for high-strength steels. It substantially increases the resistance to both general and localized corrosion, strongly promotes ferritic structure, and increases mechanical strength. It also promotes the formation of secondary phases in ferritic, ferritic-austenitic and austenitic steels. The liner alloy may comprise Mo in an amount from 0.5 to 2 wt. %, and in some embodiments from 0.9 to 1.1 wt. %. The amount of Mo is selected to provide the right level of austenitic stability.

Mn (manganese) increases strength but reduces the ductile/brittle transition temperature. Mn is an austenite stabilizer and gives finer grained ferrite and more finely divided pearlite. It is also a de-oxidizer which means neutralizing oxygen that might still be around from producing steel in the first place. Mn also improves surface quality. The liner alloy may comprise Mn in an amount from 0.5 to 2 wt. %, and in some embodiments from 0.9 to 1.1 wt. %.

Si (silicon) is added in almost every steel for removing oxygen by forming $SiO_2$ which floats on top of the liquid iron and can be ladled off. Si also provides solid-solution strengthening and affect the martensitic transformation of the matrix. The liner alloy may comprise Si in an amount of less than 1 wt. %, and in some embodiments from 0.4 to 0.6 wt. %.

Al (aluminium) is also a strong de-oxidizer and removes oxygen by forming $Al_2O_3$. Al also strongly reacts with nitrogen by forming AlN. Al is a strong ferrite stabilizer which opposes austenite formation. The liner alloy may comprise Al in an amount of less than 0.5 wt. %, and in some embodiments less than 0.2 wt. %. Al content is very low, just to provide enough de-oxidation for weld metal and to protect the oxidation of other elements.

The liner alloy according to the embodiment of the present invention may be exemplified by a first composition Z1 that contains Fe and in wt. %: C 0.8; Cr 15; B 0.8; Ti 0.5; Nb 3.5; V 0.5; W 0.2; Mo 1.0; Si 0.5 and Al 0.1.

The liner alloy according to the embodiment of the present invention may be exemplified by a second composition Z2 that contains Fe and in wt. %: C 0.8; Cr 16; B 0.8; Ti 3.5; Nb 0.5; V 0.5; W 0.2; Mo 1.0 and Si 0.5.

The liner alloy according to the embodiment of the present invention may be exemplified by a third composition Z3 that contains Fe and in wt. %: C 0.8; Cr 16; B 0.8; Ti 0.5; Nb 3.5; V 0.5; W 0.2; Mo 1.0 and Si 0.5.

All three compositions are displayed in Table 1.

TABLE 1

| Alloy | C | Cr | B | Ti | Nb | V | W | Mo | Mn | Si | Al | Fe |
|---|---|---|---|---|---|---|---|---|---|---|---|---|
| Z1 | 0.8 | 15 | 0.8 | 0.5 | 3.5 | 0.5 | 0.2 | 1.0 | 1.0 | 0.5 | 0.1 | Remaining |
| Z2 | 0.8 | 16 | 0.8 | 3.5 | 0.5 | 0.5 | 0.2 | 1.0 | 1.0 | 0.5 | — | Remaining |
| Z3 | 0.8 | 16 | 0.8 | 0.5 | 3.5 | 0.5 | 0.2 | 1.0 | 1.0 | 0.5 | — | Remaining |

Figure 1:
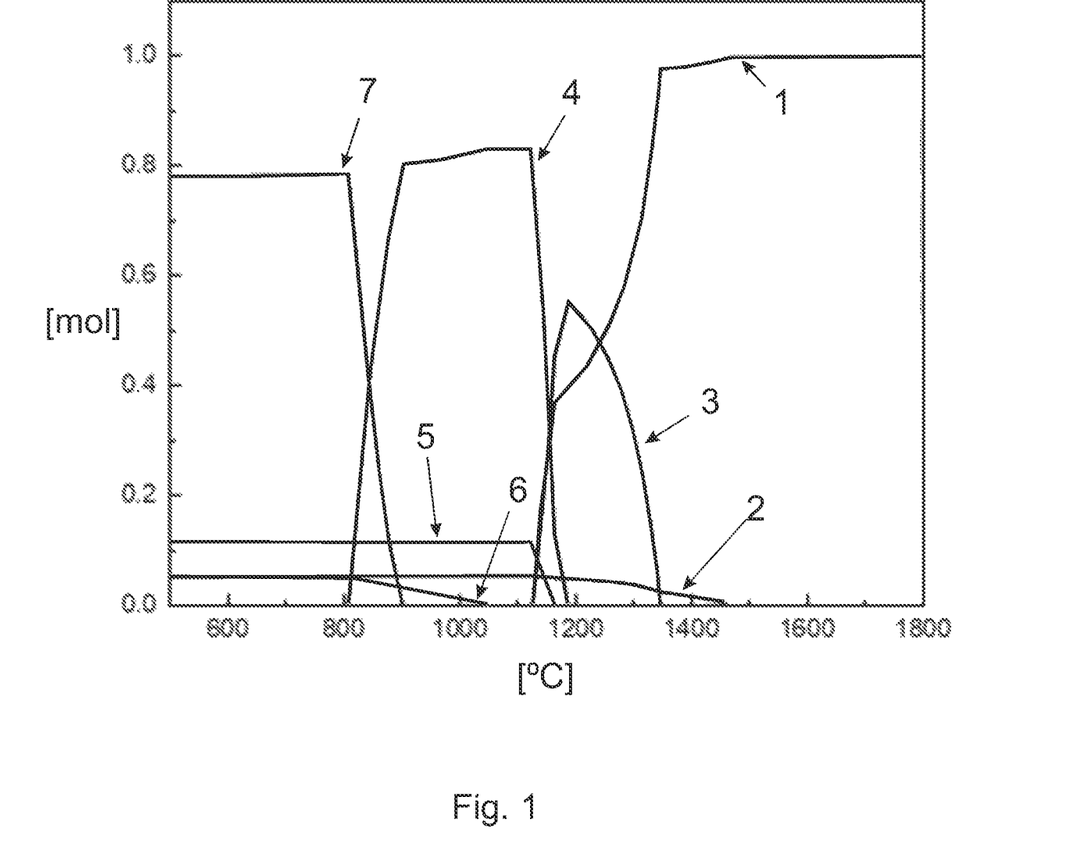
FIG. 1 shows a phase evolution diagram for an embodiment of the disclosure.

FIG. 1 shows a ThermoCalc (software available from Thermo-Calc Software AB, Råsundavägen 18, SE-169 67 Solna, SWEDEN) analysis of a composition Z3 of above after welding. Horizontal axis shows the temperature and vertical axis amount of all phases. The analysis predicts that primary carbides 2 are formed first when the solidification of liquid 1 alloy begins at 1450° C. This is followed by formation of delta-ferrite 3 at 1350° C. and austenite 4 at 1190° C. Eutectic boride 5 begins to form at 1170° C. and $M_{23}C_6$-type carbide 6 at 1050° C., and they are stable at 500° C. Alpha-ferrite 7 begins formation at 900° C. At lower temperatures, the austenite transforms to martensite. The remaining eutectic structure in room temperature is martensite with primary carbides 2 and eutectic boride 5 and $M_{23}C_6$-type carbide 6.

Primary carbides in this context refers to carbides which are formed at higher temperature and formed by layers of shell or/and consist of multiple parts.

Eutectic carbide in this context refers to eutectic boride and cubic $M_{23}C_6$-type carbides which are formed at lower temperature than primary carbides and is the main reason for improved strength and crack resistance.

Austenite structure in this context refers to a solid solution of mostly Fe and alloying elements and exists above critical eutectoid temperature. In plain carbon steel, this temperature is 727° C. (1000° K).

Martensitic structure in this context refers to a hard, crystalline structure which is formed through diffusionless transformation. Martensite is formed by the rapid cooling of the austenite at a such a high rate that C atoms do not have time to diffuse out of the crystal structure in large enough quantities to form cementite, which would normally result in a slower cooling rate.

Figure 2:
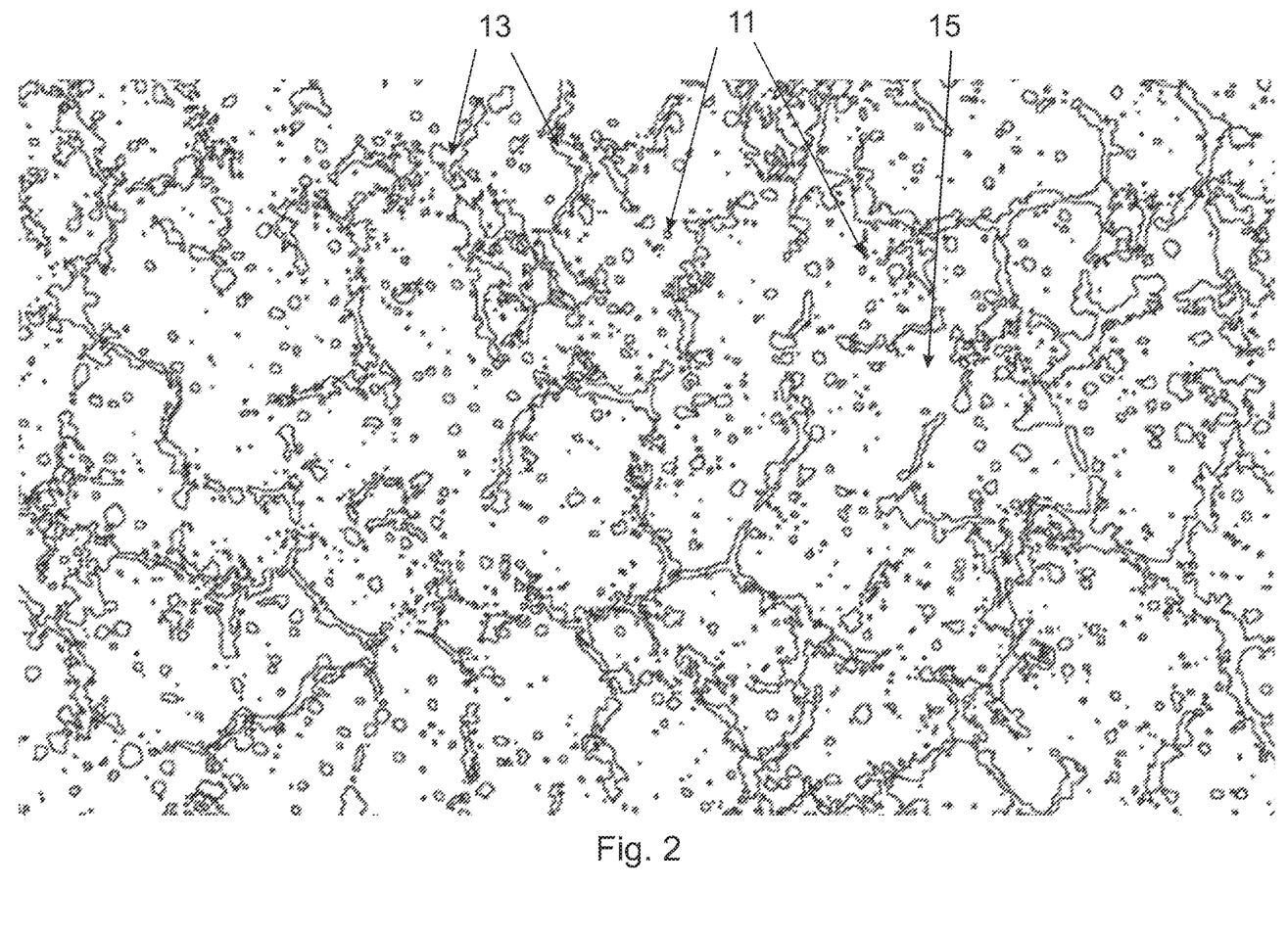
FIG. 2 shows a SEM micrograph image of primary carbides and eutectic carbides of an embodiment.
Figure 3:
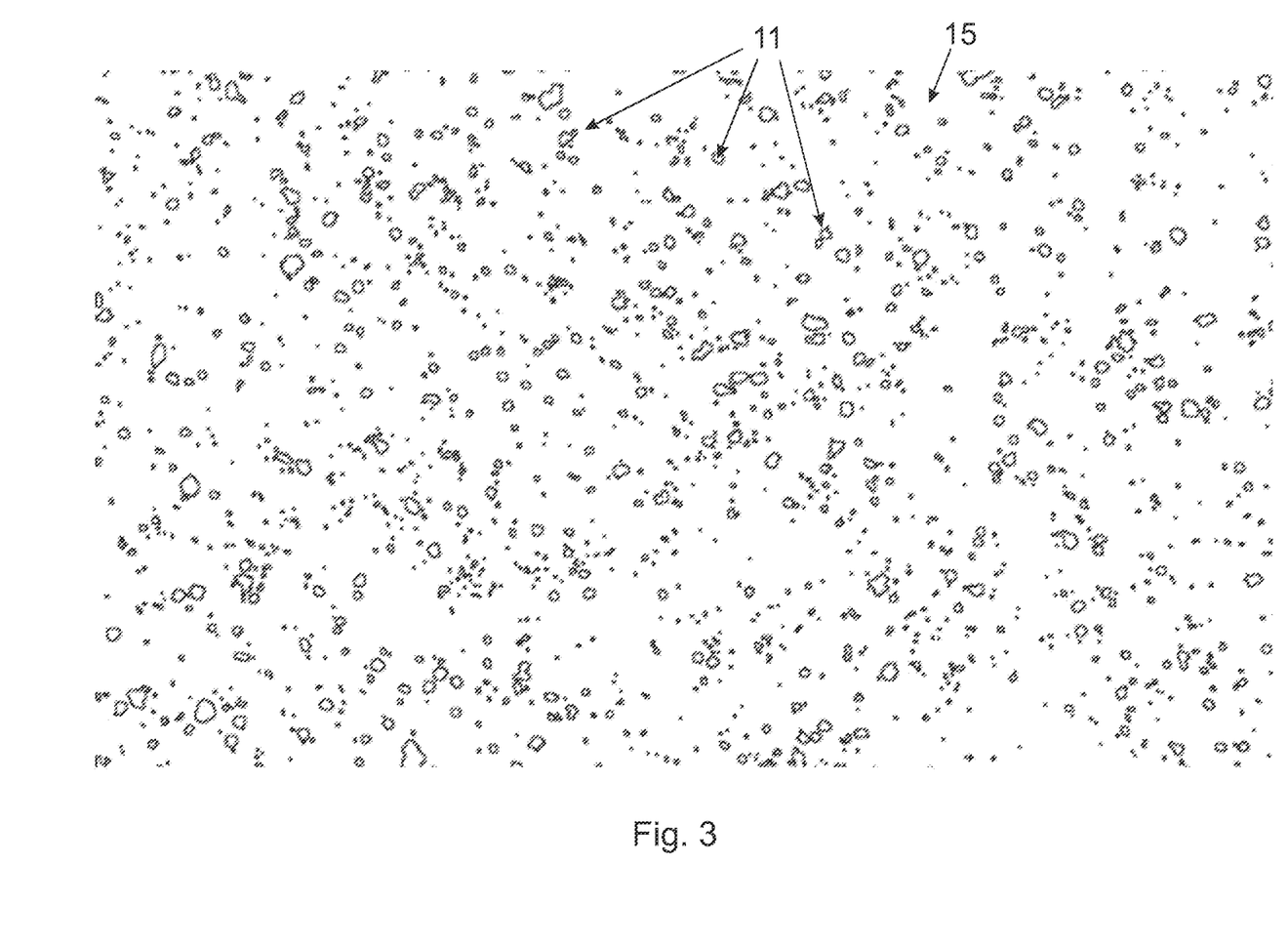
FIG. 3 shows an image extraction of pure primary carbides of FIG. 2.
Figure 4:
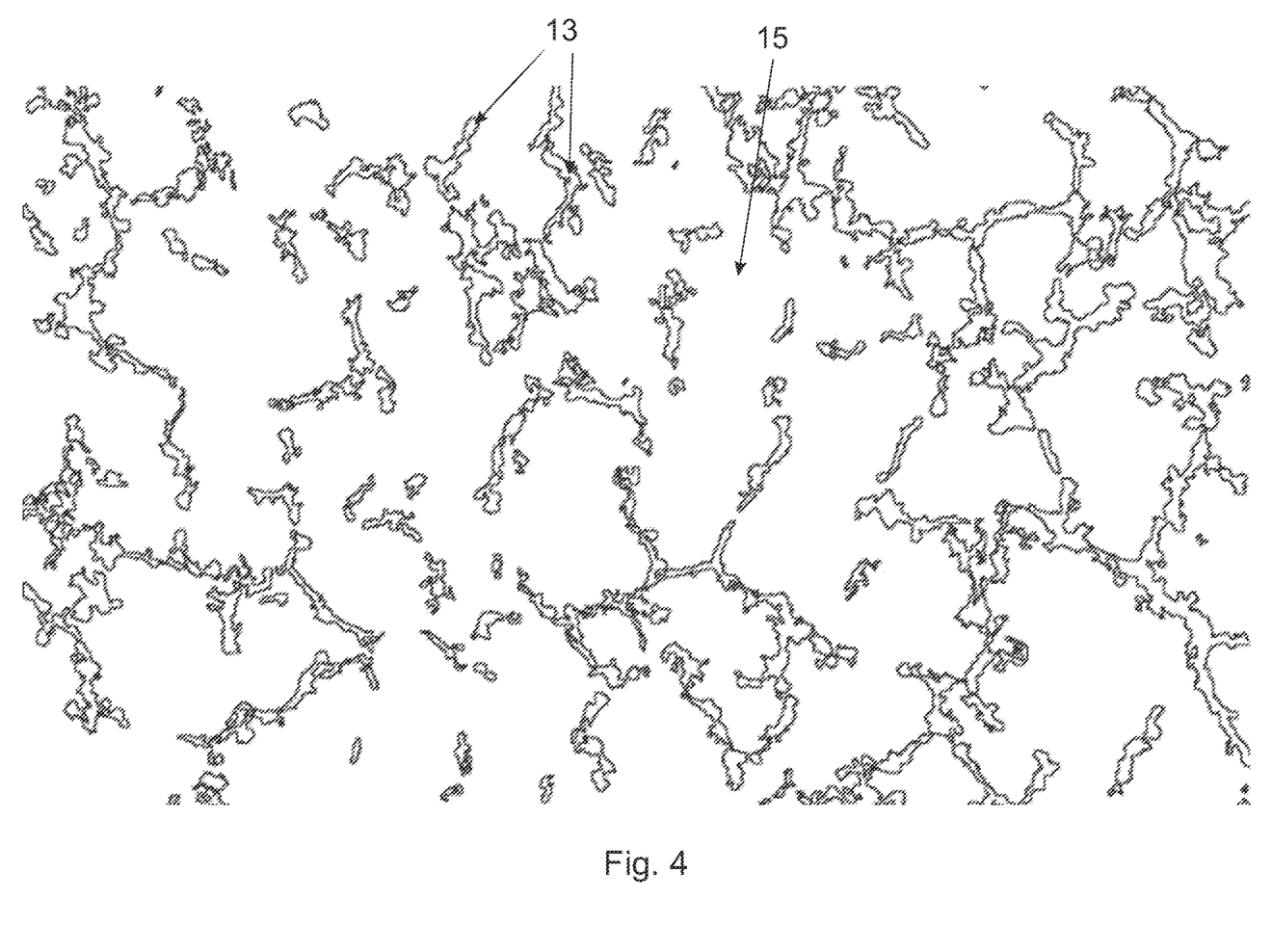
FIG. 4 shows an image extraction of pure eutectic carbides of FIG. 2.

FIGS. 2-4 show the liner material Z1 composition under different imaging conditions. FIG. 2 shows a Scanning Electron Microscope (SEM) micro-graph image of primary carbides (spherical particles) 11 and eutectic carbides (networked) 13 of an embodiment. The matrix 15 is martensite or retained austenite.

Microstructural Criteria: Wear Resistance

FIG. 3 shows an image extraction of FIG. 2 where pure primary carbides 11 are exposed separate from the matrix 15. As shown in this image, primary carbides 11 are uniformly distributed in the sample. They are very hard particles that enhance wear resistance.

Abrasion wear refers to a wear mode when hard particles or projections are forced against and moved, relative to a surface. Material is lost from the surface by a ploughing or a chipping action depending on whether the surface is ductile or brittle.

In corrosive wear, tribochemical reaction at the contact interface is accelerated. When the tribochemical reaction in the corrosive media is induced by material removal, the resultant wear is called corrosive wear. The material removal is governed by the growth of chemical reaction film or where chemical reactions are activated and accelerated by frictional deformation, frictional heating, microfracture and successive removal of reaction products on wear surface. This type of wear is generally described as chemical wear or tribochemical wear.

In some embodiments, an alloy can be described by microstructural features which result in the desired performance of the alloy. In some embodiments, an alloy can be said to meet a certain microstructural feature which results in wear resistance. The experimentally measured volume fraction of primary carbides by X-ray powder diffraction (XRD) can be used to describe the alloy's wear resistance. The alloy can be said to meet the microstructural criteria for wear resistance if the volume fraction of primary carbides is at certain range. In some embodiments, the volume fraction of primary carbides is less than 0.1. In some embodiments, the volume fraction of primary carbides is from 0.02 to 0.07. In some embodiments, the volume fraction of primary carbides is from 0.03 to 0.05.

In some embodiments, an alloy can be described by hardness which refers to the mechanical property of a material to resist plastic deformation, penetration, indentation and scratching. The resistance to wear by friction or erosion generally increases with hardness.

A Vickers hardness as surface hardness of the liner alloy was measured. A square pyramid diamond indenter having an angle α between opposite faces of 136° was forced into the surface of the liner alloy. A surface area S ($mm^2$) was calculated from the length d (mm) of a diagonal of an indentation remained after load removal. The Vickers hardness was calculated from the relation between the test force and the surface area according to a predetermined computational expression. In some embodiments, the liner alloy element has a hardness of HV 650-800. In some embodiments, the liner alloy element has a hardness of HV 680-760. In some embodiments, the liner alloy element has a hardness of HV 700-740.

Microstructural Criteria: Crack Resistance

FIG. 4 shows an image extraction of FIG. 2 where pure eutectic carbides are exposed. High-temperature hardness is made possible only by a very important strengthening mechanism, which is secondary hardening, promoted by the precipitation of fine alloy carbides 13. For martensitic stainless steel, eutectic carbides 13 precipitate in the matrix 15 through heat treatment in the final process, which can result in secondary hardening. Such precipitation intensity depends on the amount of alloy elements in solid solution, which is related to the alloy composition and the heat treatment.

In some embodiments, an alloy can be said to meet a certain microstructural feature which results in crack resistance. The experimentally measured volume fraction of eutectic carbides by XRD can be used to describe the alloy's crack resistance. The alloy can be said to meet the microstructural criteria for crack resistance if the volume fraction of eutectic carbides is at certain range. In some embodiments, the volume fraction of eutectic carbides is more than 0.3. In some embodiments, the volume fraction of eutectic carbides is from 0.3 to 0.4. In some embodiments, the volume fraction of eutectic carbides is from 0.34 to 0.38.

Microstructural Criteria: Corrosion Resistance

Corrosion resistance refers to the resistance a material offers against a reaction with adverse elements that can corrode the material.

Cr in steel forms a very thin layer of oxide that prevents the corrosion of steel and the presence of the oxide film prevents additional corrosion by acting as a barrier that limits oxygen and water access to the underlying metal surface. Cr has a dominant role in reacting with oxygen to form this oxide film.

In some embodiments, an alloy can be said to meet a certain microstructural feature which results in corrosion resistance. The alloy can be said to meet the microstructural criteria for corrosion resistance if it contains a range of Cr content in the composition. In some embodiments, the range of Cr content in the composition is from 10 to 30 wt. %. In some embodiments, the range of Cr content in the composition is from 13 to 22 wt. %. In some embodiments, the range of Cr content in the composition is from 15 to 20 wt. %. In some embodiments, the Cr content in the composition is from 15 to 16 wt. %.

Figure 5:
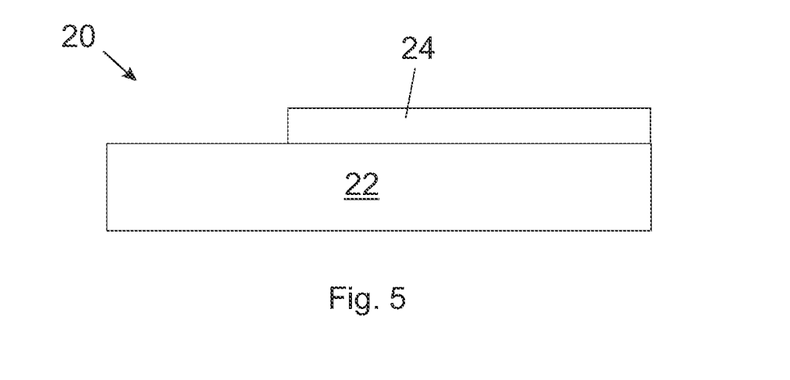
FIG. 5 shows a first embodiment of a steel element.
Figure 6:
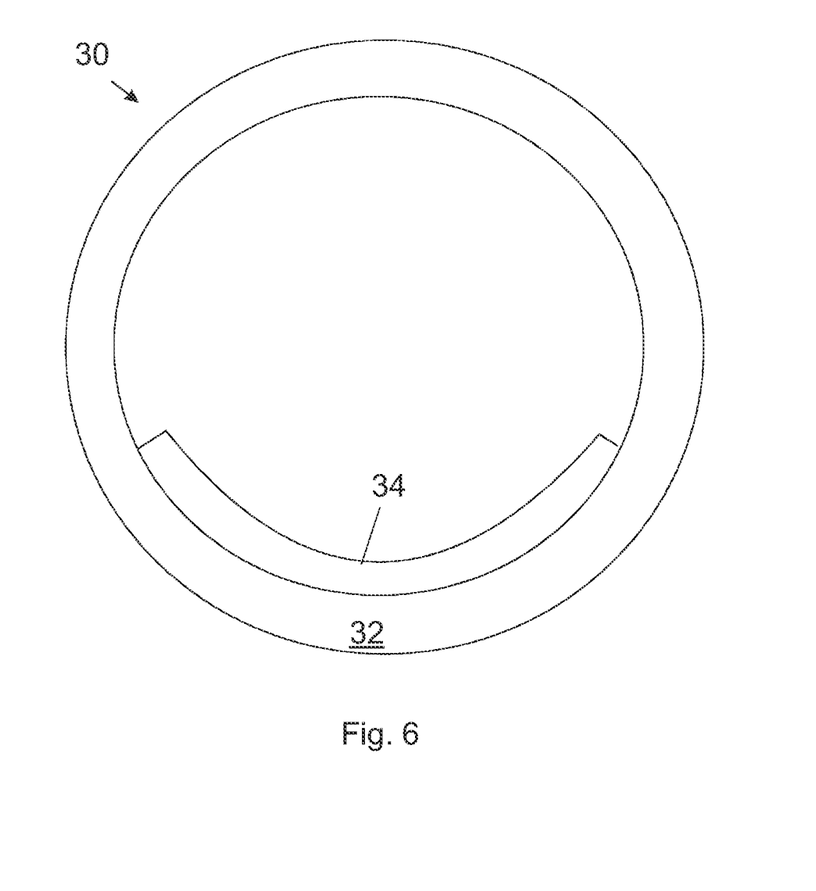
FIG. 6 shows a second embodiment of a steel element.

FIGS. 5 and 6 shows two embodiments of a steel element 20, 30 wherein FIG. 5 illustrates a plate and FIG. 6 illustrates a pipe. The steel element 20, 30 according to an embodiment of the present invention includes a base steel 22, 32 and a liner alloy element 24, 34 deposited on the base steel. Deposition in this context refers to overlaying the liner alloy on or over a surface of the base steel 22, 32, and can be provided by welding, for instance. The base steel 22, 32 can be low-alloyed or unalloyed carbon steel which has been quenched and tempered. The base steel 22, 32 can also be a cast steel or stainless steel.

The resultant liner alloy element 24, 34 deposited on the base steel 22, 32 can comprise a Vickers hardness of HV 650 to 800 with less than 0.1 volume fraction of primary carbides, more than 0.3 volume fraction of networked eutectic carbides, and remaining volume fraction comprising martensite and retained austenite, wherein the volume fraction mentioned above sum to 1.

The liner alloy element 24, 34 deposited on the base steel according to another embodiment can comprise a Vickers hardness of HV 680 to 760 with from 0.02 to 0.07 volume fraction of the primary carbides, from 0.3 to 0.4 volume fraction of the networked eutectic carbides, and remaining volume fraction comprising martensite and retained austenite, wherein the volume fraction mentioned above sum to 1.

The liner alloy element 24, 34 deposited on the base steel according to another embodiment can comprise a Vickers hardness of HV 700 to 740 with from 0.03 to 0.05 volume fraction of the primary carbides, from 0.34 to 0.38 volume fraction of the networked eutectic carbides, and remaining volume fraction comprising martensite and retained austenite, wherein the volume fraction mentioned above sum to 1.

The grain size of the liner alloy element 24, 34 deposited on the base steel 22, 32 can vary from 5 to 20 microns. The grain size can affect mechanical properties, especially strength, by controlling the length of the dislocations a grain can contain. All grains are separated by the grain boundaries which act as an obstacle to the dislocations. The increasing number of dislocations increases the strength of the metal.

The base steel 22 can be a steel plate wherein the liner alloy element 24 coats at least a portion of at least one surface of the steel plate 22. The liner alloy element 24 can also coat the whole plate 22 or both surfaces.

The base steel can also be a steel pipe 32 wherein the liner alloy element 34 coats at least a portion of an interior diameter of the pipe 32. The liner alloy element 34 can also coat the whole interior diameter or outer diameter of the pipe 32.

Figure 7:
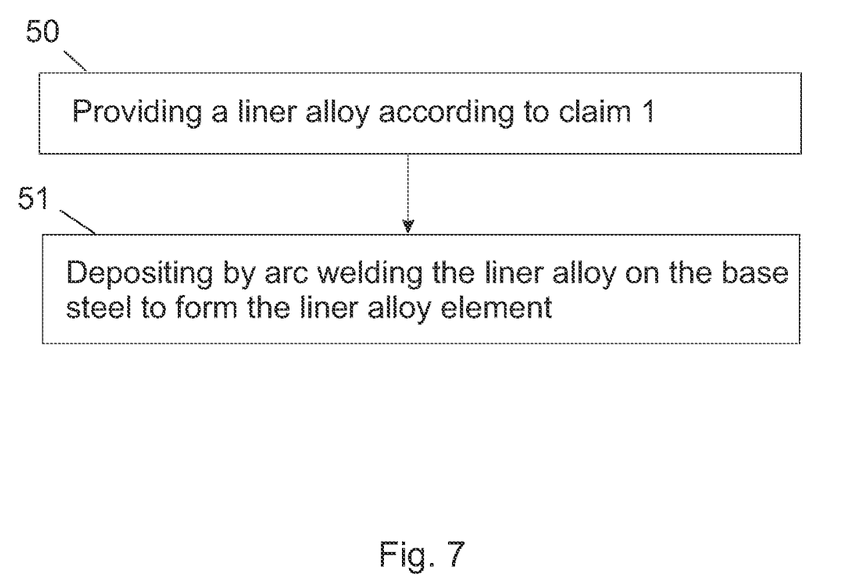
FIG. 7 shows a flow chart of a method for manufacturing a steel element.

FIG. 7 shows a flow chart of a method for manufacturing a steel element 20, 30. The method comprises 50) providing a liner alloy with a chemical composition according to claim 1, and 51) depositing the liner alloy on the base steel 22, 32 by arc welding to form the liner alloy element 24, 34 of the base steel. The method of depositing the liner alloy on the base steel 22, 32 can be one or more of arc welding techniques such as MIG welding, TIG welding, submerged arc welding or PTA welding, for instance. In the welding method, liner alloy is deposited on the base metal 22, 32 by melting the liner alloy, which can be in powder, wire or strip form, for instance.

It will be obvious to a person skilled in the art that, as the technology advances, the inventive concept can be implemented in various ways. The invention and its embodiments are not limited to the examples described above but may vary within the scope of the claims.

The invention claimed is:

1. A liner alloy consisting of:
from 0.5 to 3 wt. % of C,
from 10 to 30 wt. % of Cr,
from 0.6 to 1.0 wt. % of B,
less than 4 wt. % of Ti,
less than 4 wt. % of Nb,
less than 1 wt. % of V,
less than 1.5 wt. % of W,
from 0.5 to 2 wt. % of Mo,
from 0.5 to 2 wt. % of Mn,
less than 1 wt. % of Si,
less than 0.5 wt. % of Al, wherein
the wt. % is based on total weight of the liner alloy with remainder being Fe and inevitable impurities.

2. The liner alloy according to claim 1, wherein the C is present in an amount from 0.7 to 1.0 wt. %.

3. The liner alloy according to claim 1, wherein the Cr is present in an amount from 15 to 20 wt. %.

4. The liner alloy according to claim 1, wherein the Ti is present in an amount from 0.5 to 3.5 wt. %.

5. The liner alloy according to claim 1, wherein the Nb is present in an amount from 0.5 to 3.5 wt. %.

6. The liner alloy according to claim 1, wherein the V is present in an amount from 0.4 to 0.6 wt. %.

7. The liner alloy according to claim 1, wherein the W is present in an amount from 0.1 to 0.3 wt. %.

8. The liner alloy according to claim 1, wherein the Mo is present in an amount from 0.9 to 1.1 wt. %.

9. The liner alloy according to claim 1, wherein the Mn is present in an amount from 0.9 to 1.1 wt. %.

10. The liner alloy according to claim 1, wherein the Si is present in an amount from 0.4 to 0.6 wt. %.

11. The liner alloy according to claim 1, wherein the Al is present in an amount of less than 0.2 wt. %.

12. A steel element comprising:
a base steel, and
a liner alloy element comprising a liner alloy deposited on the base steel, wherein the liner alloy consists of:
from 0.5 to 3 wt. % of C,
from 10 to 30 wt. % of Cr,
less than 2 wt. % of B,
less than 4 wt. % of Ti,
less than 4 wt. % of Nb,
less than 1 wt. % of V,
less than 1.5 wt. % of W,
from 0.5 to 2 wt. % of Mo,
from 0.5 to 2 wt. % of Mn,
less than 1 wt. % of Si,
less than 0.5 wt. % of Al, wherein
the wt. % is based on total weight of the liner alloy with remainder being Fe and inevitable impurities,
wherein the liner alloy element has a hardness of HV 650-800 and comprises:
(i) less than 0.1 volume fraction of primary carbides,
(ii) more than 0.3 volume fraction of networked eutectic carbides, and
(iii) a remaining volume fraction comprising martensite and retained austenite, wherein
the volume fraction of (i), (ii) and (iii) sum to 1.

13. The steel element according to claim 12, wherein the liner alloy element has a hardness of HV 680-760 and further comprises:
(i) from 0.02 to 0.07 volume fraction of the primary carbides,
(ii) from 0.3 to 0.4 volume fraction of the networked eutectic carbides, and
(iii) the remaining volume fraction comprising the martensite and retained austenite.

14. The steel element according to claim 12, wherein the liner alloy element has a hardness of HV 700-740 and comprises:
(i) from 0.03 to 0.05 volume fraction of the primary carbides,
(ii) from 0.34 to 0.38 volume fraction of the networked eutectic carbides, and
(iii) the remaining volume fraction comprising the martensite and retained austenite.

15. The steel element according to claim 12, wherein the liner alloy element has a grain size of 5 to 20 microns.

16. The steel element according to claim 12, wherein the base steel is a steel plate, and wherein the liner alloy coats at least a portion of at least one surface of the steel plate.

17. The steel element according to claim 12, wherein the base steel is a steel pipe, and wherein the liner alloy coats at least a portion of an interior diameter of the steel pipe.

18. The steel element according to claim 12, wherein the base steel is quenched and tempered unalloyed or low-alloyed steel, cast steel or stainless steel.

19. A method of manufacturing the steel element according to claim 12, wherein the method comprises depositing by arc welding the liner alloy on the base steel to form the liner alloy element of the base steel.

* * * * *